Oct. 16, 1934.  J. R. WINTON  1,977,601
FLUID STRAINER
Filed June 2, 1932   2 Sheets-Sheet 1

Inventor:
John R. Winton
By: Wm O. Bell
Atty.

Oct. 16, 1934.  J. R. WINTON  1,977,601
FLUID STRAINER
Filed June 2, 1932  2 Sheets-Sheet 2

Inventor:
John R. Winton
By Wm O Bell
Att'y.

Patented Oct. 16, 1934

1,977,601

UNITED STATES PATENT OFFICE 1,977,601

FLUID STRAINER

John R. Winton, Chicago, Ill., assignor, by mesne assignments, to Fred Huettmann, Wilmette, Ill.

Application June 2, 1932, Serial No. 614,920

14 Claims. (Cl. 210—167)

This invention relates to certain novel improvements in fluid strainers, particularly of the kind employed in water supply systems to effect removal of solids from the water to prevent clogging of pipe lines, pumps, valves, spray nozzles and the like to which the water is supplied.

Strainers of the kind to which my invention appertains are often used in industrial enterprises where large quantities of water are required, and it is of utmost importance that the water supply be constant and consequently it is necessary that solid matter separated from the water be removed from the strainers so that the water supply will not be reduced or shut off due to clogging of the strainer. It is, therefore, among the objects of my invention to provide a novel strainer from which solid matter separated from the water may be removed without interrupting the flow of water through the strainer.

Other objects are to provide a strainer wherein the separated and collected solid matter is scraped from the strainer member to insure removal thereof; wherein the separated and collected solid matter is discharged from the strainer through an outlet independent of the strained water outlet of the device; wherein the removal of the separated and collected solid matter is under control of the operator; wherein solid matter collected on the strainer member is scraped into a pocket or the like from which it is easily withdrawn to move out through the discharge passage therefor; and wherein the various parts may be expeditiously assembled and economically manufactured to provide a strainer of efficient and positive operation.

Selected embodiments of the invention are illustrated in the accompanying drawings and therein Fig. 1 is a longitudinal sectional view of one form of strainer constructed in accordance with my invention;

The improved and novel strainer of my invention is adapted to be interposed in a pipe line leading from a source of water supply to a pump, condenser or the like and the strainer serves to remove solid foreign matter from the water to prevent accumulation of this matter in the device to which the water is directed to thereby obviate interruption of the operation of the water supply system because of the collection of solid matter therein.

Figure 1:
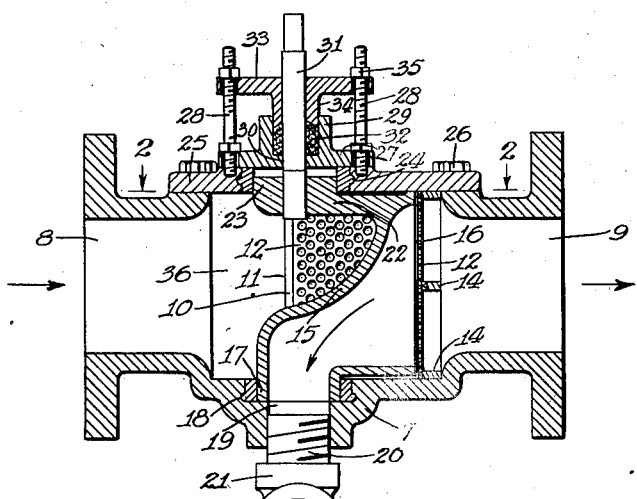
Figure 2:
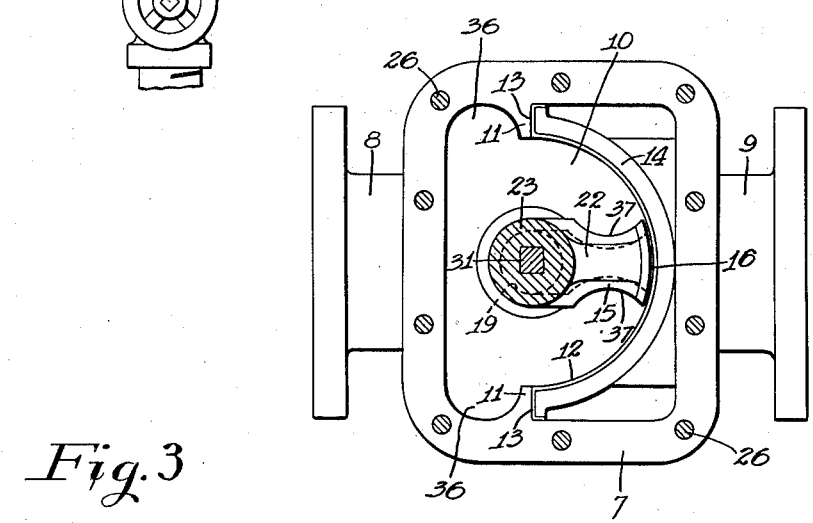
Fig. 2 is a plan view taken substantially on the line 2—2 on Fig. 1.

In the form of my invention shown in Figs. 1 and 2, 7 indicates the valve body or housing, 8 the water inlet, 9 the water outlet, and 10 a strainer chamber interposed between the inlet and the outlet. Inwardly extending ribs 11 are integral with the body 7 and project into the chamber 10 on opposite sides thereof and the strainer member is secured to these ribs to be supported in the chamber 10 between the top and bottom walls thereof. In this form of the invention, a semi-circular strainer in the nature of a screen or basket 12 is provided which has foot portions 13 at opposite ends thereof adapted to rest against flat faces on the ribs 11. A bracket member 14 composed of three semi-circular ribs is arranged about the screen 12 to secure the same in engagement with the ribs 11, the bracket including ribs arranged at the outer edges of the screen and a rib intermediate these two ribs. Water flows from the inlet 8 into the chamber 10 and through the basket 12 and out through the outlet 9 and solid matter in the water is separated therefrom as the water passes through the basket 12 and this solid matter collects on the side of the basket facing the inlet 8. This solid matter may firmly adhere to this face of the basket and I have found that it can best be removed by being scraped from the basket and to this end I provide means for scraping the separated matter from the screen and I provide pockets into which this solid matter may be dumped after being scraped from the basket. I also provide means affording discharge of the solid matter from the strainer and I so arrange the scraper and discharge means that they may be operated to effect removal of solid matter from the strainer without interrupting the flow of water therethrough. I provide a nozzle through which the solid matter may be discharged from the strainer and I also use this nozzle as the means for scraping the solid matter from the strainer basket. In Figs. 1 and 2, I show a nozzle 15 including an inlet portion 16 shaped to fit the basket 12, a slight clearance being provided between the inlet portion 16 and the basket. The lower or outlet end of the nozzle 15 is journaled in a bearing ring 18 mounted in a recess in the body 7 and in alignment with this recess there is a boss on the body through which the outlet passage 19 extends from the recess so that the outlet end of the nozzle opens into the outlet passage. A pipe 20 communicates with the outlet passage and has a valve 21 therein to regulate passage therethrough. The nozzle 15 has a rib 22 thereon providing a bearing portion 23 that is aligned with the portion of the nozzle journaled in the bearing ring 24 mounted in an opening in the cover plate 25 closing the open side of the body 7 and held in position by the bolts 26. The nozzle 15 is therefore rotatable in the bearing rings 18 and 24. Arranged to close the opening in the plate 25 in which the bearing ring 24 is mounted is a plate 27, secured in position by nuts on the stud bolts 28, and this plate includes a gland 29 aligned with an opening 30 through which a stem 31 extends, the lower end of the stem extending through the bearing portion 23 to be connected to the rib 22. Suitable packing material 32 is arranged in the gland 29 about the stem 31. A plate 33 includes a gland 34 having an opening therein through which the stem 31 is extended and the gland 34 extends into the gland 29 and engages the packing material therein. The stud bolts 28 extend through openings in the plate 33 and nuts 35 are provided for so securing the plate 33 in position that the packing 32 is tightly engaged with the stem 31 to prevent water leakage thereby. Pockets 36 are provided adjacent the ribs 11 at each end of the basket 12. The sides of the nozzle 15 are recessed at 37 and when a handle or the like is connected to the stem 31 so that the stem and therefore the nozzle 15 may be turned, the inlet portion 16 of the nozzle is moved over the surface 12 on which the solid matter separated from the water has collected. The inlet portion 16 scrapes this material from the basket and the scraped material collects in the recess 37 on the side of the nozzle 15 facing in the direction in which said nozzle is being turned and as the nozzle reaches the end of the basket 12 and before it moves into alignment with the pocket 36 the solid matter is dumped into the pocket 36 and as the walls of the pocket 36 are spaced from the inlet portion of the nozzle, it is manifest that the collected solid matter may freely move into the nozzle. The pipe 20 is connected to a suitable suction creating means (not shown) and consequently when the valve 21 is opened water will be sucked into the nozzle and this suction effectively draws any solid matter collected in a pocket 36 into the nozzle to be discharged through the pipe 20. Furthermore, as the nozzle 15 moves over the basket 12, the water flow through the portion of the basket 12 aligned with the nozzle 15 is reversed and hence fine solid matter collected on the basket 12 is washed therefrom as the water flows into the nozzle 15. It is therefore apparent that the basket 12 is cleaned not only by a scraping action but also by a reversal of the direction of flow therethrough and as this direction of flow is reversed subsequent to the scraping action, it is manifest that solid matter loosened by the scraping action is easily removed from the basket to be discharged from the strainer. There is a pocket at each end of the basket and the surface of this basket is effectively cleaned when the nozzle is moved thereover in either direction. The pressure differential at the orifice of the nozzle 15 on opposite sides of the basket 12 when the valve in the discharge passage is open, remains constant at all points on the basket as the nozzle sweeps over the surface. This pressure differential brought about by opening the valve in the discharge passage is the difference in pressure between that in the trap body and that maintained in the discharge passage. A uniform pressure differential over all parts of the screen has not been attained heretofore but inasmuch as all parts of the basket are equidistant from the discharge passage and as the reverse in flow of water through the basket is equal to the area of the opening in the nozzle, it is clear that the constant pressure differential results and this effects uniform cleaning of the screen.

Figure 3:
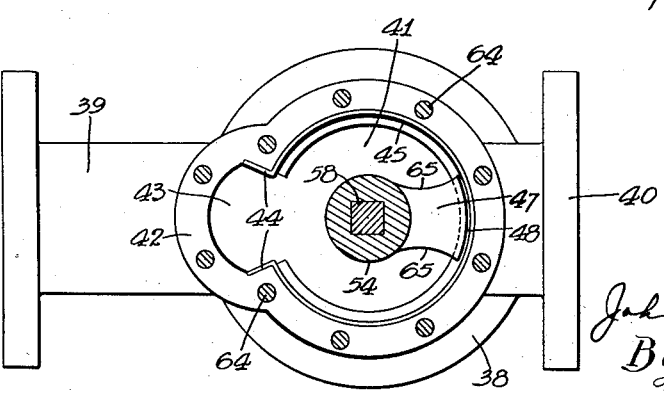
Fig. 3 is a plan view taken substantially on the line 3—3 on Fig. 4.
Figure 4:
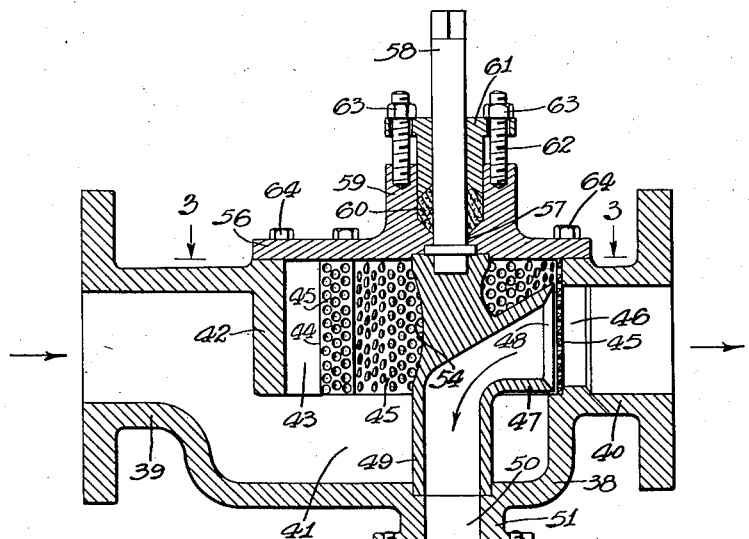
Fig. 4 is a longitudinal sectional view of another form of strainer made in accordance with my invention.

In the embodiment of the invention illustrated in Figs. 3 and 4, a strainer is shown wherein a substantially circular basket is provided and herein 38 indicates the body of the strainer, 39 the inlet, 40 the outlet, and 41 the strainer chamber. Adjacent the inlet 39 there is a depending rib 42 providing a pocket 43 in which the end portions 44 of a strainer or basket 45 are secured. Water flows through the inlet 39 into chamber 41 through basket 45 into passage 46 and out through the outlet 40, the passage 46 extending about the basket 45 from opposite sides of the pocket 43. A nozzle 47 is provided and includes an inlet portion 48 and an outlet portion 49 in the form of a pipe, the lower end of the outlet portion being journaled in a recess in the body 38 about the outlet passage 50 extending through the boss 51, a pipe 52 being connected to the boss 51 and having a valve 53 therein. On the nozzle 47 opposite the outlet portion 49 is a boss 54 having a bearing portion at the outer end thereof journaled in a recess in the cover plate 56 which has an opening 57 therein through which the stem 58 is extended, the lower end of the stem being connected to the boss 54. A gland 59 is unitary with the plate 56, and the stem 58 extends therethrough and packing 60 in the gland is forced into engagement with the stem by the gland 61 extended into the gland 59 and held in position by the stud bolts 62 and nuts 63. The cover plate 56 is retained in position by the bolts 64. The sides of the nozzle 47 are recessed as indicated at 65 and solid matter separated from the water and collected on the basket 45 is scraped from said basket and collected in the recesses 65 as the nozzle 47 is moved over the screen 45 and the solid matter collected in the recesses 65 is dumped into the pocket 43 as the nozzle 47 moves into alignment therewith. Material dumped into the pocket 43 is withdrawn through the nozzle 47 when the valve 53 is open for the pipe 52 like the pipe 20 is connected to a suitable suction creating means. The material dumped into the pocket 43 does not fall therefrom by reason of the flow of water past the bottom thereof and as the nozzle 47 opens in the direction of water flow, in this embodiment of the invention it is manifest that the discharge of material through the nozzle is effectively brought about when the valve 53 is opened.

Figure 5:
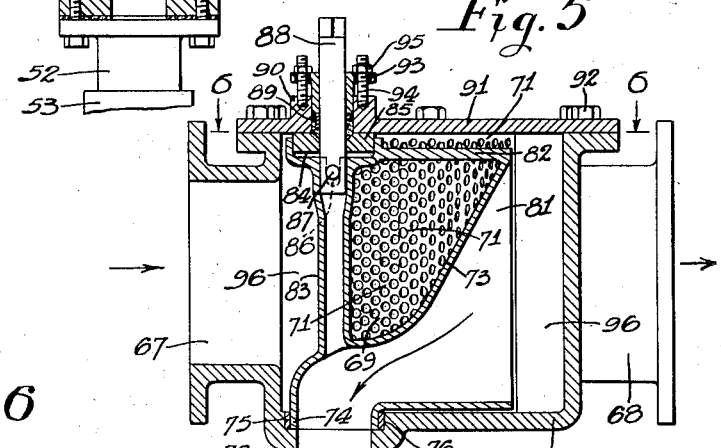
Fig. 5 is a longitudinal sectional view, taken substantially on the line 5—5 on Fig. 6, of still another form of strainer embodying my invention.
Figure 6:
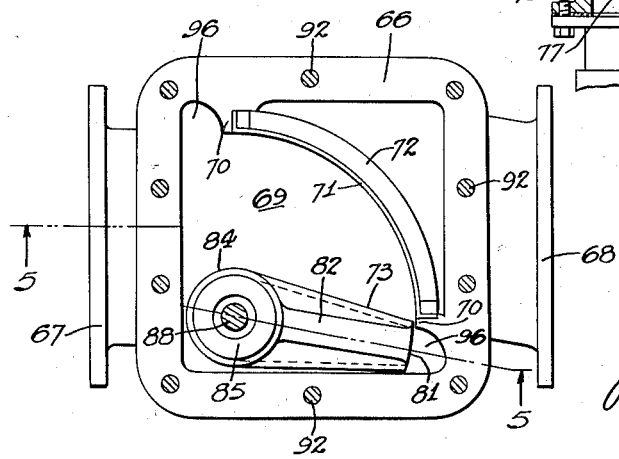
Fig. 6 is a plan view taken substantially on the line 6—6 on Fig. 5.

Another form of strainer is illustrated in Figs. 5 and 6 and herein a strainer or basket in the form of a quadrant is employed. In Figs. 5 and 6, 66 is the strainer body, 67 is the inlet, 68 is the outlet, and 69 is the strainer chamber intermediate the inlet and outlet. On the walls of the strainer chamber adjacent the outlet 68 are ribs 70 and the strainer or basket 71 extends between these ribs and is retained in position by a bracket 72 similar to the bracket 14. The nozzle 73 includes an outlet portion 74 journaled in the bearing ring 75 arranged in the recess 76 about the outlet passage 77 in the boss 78 to which the pipe 79 is connected, said pipe having a valve 80 therein. The inlet portion 81 of the nozzle 73 is co-extensive with the effective height of the screen 71 and extending from the upper end thereof is a rib 82 which is connected to a neck 83 that extends from the nozzle 73 in alignment with the outlet portion 74 thereof and at the upper end of the neck 83 is a pocket 84 in which a block 85 is mounted. Diametrically opposite slots 86 extend into the upper end of the neck 83 to receive a pin 87 which extends diametrically through the stem 88. The stem 88 extends through an opening in the block 85 and through packing 89 in the gland 90 formed on the plate 91 held in position over one side of the body 66 by bolts 92. The gland 93 serves to force the packing 89 into engagement with the stem 88 and is held in position by stud bolts 94 and nuts 95. Adjacent the ribs 70 and the opposite ends of the screen 71 are pockets 96 and when the stem 88 is turned to move the inlet portion 81 of the nozzle 73 over the basket 71 solid matter scraped from the basket is dumped into the pockets 96 from whence it is removed through the nozzle 73 when the valve 80 is open, the pipe 79 being connected to a suitable suction creating means. Should the nozzle 73, outlet passage 77, pipe 79, or valve 80 become clogged the bolts 92 may be loosened whereupon the plate 91 may be removed, it being understood that the water supply to the strainer will be previously shut off. When the plate 91 is removed the pin 87 may be removed from the slot 86 and then a ram rod or the like may be passed through the neck 83 to break up any mass of solid matter which may have collected and this provides an expeditious way of clearing the discharge passage should the same become clogged.

It is manifest from the foregoing description that I have provided a strainer capable of constant operation for solid foreign matter separated from the liquid flowing through the strainer is collected upon the strainer member and then by manipulating a convenient means this collected solid matter is scraped from the strainer member and discharged from the strainer through a convenient passage provided for that purpose. Furthermore, the direction of flow through the strainer member may be reversed to effect cleaning thereof and this reversal of the direction of flow may be brought about subsequent to the scraping action to expedite removal of the collected material by the reversal of the direction of flow through the strainer. Moreover, the material scraped from the strainer member is discharged into a space or pocket from which it may be easily removed through the discharge nozzle provided for that purpose and when the device is in normal operation the discharge nozzle is aligned with a pocket so that the effective area of the strainer is not reduced.

In the foregoing description I have illustrated and described selected embodiments of my invention but it is to be understood that these are capable of variation and modification and I therefore do not wish to be limited to the precise details set forth but desire to avail myself of such changes and alterations as fall within the purview of the following claims.

I claim:

1. In a liquid strainer including a body having an inlet and an outlet, a strainer member mounted in said body intermediate said inlet and outlet to separate solid matter from a liquid flowing from said inlet and through said body to said outlet whereby the separated solid matter may collect on said strainer member, means for scraping collected solid matter from the strainer member and movable from side to side over said strainer member, and means providing a pocket at a side of said strainer member whereby solid matter scraped from said strainer member by the scraping means may be carried by the scraping means to be dumped into said pocket upon movement of said scraping means toward and to said pocket to permit removal of the solid matter from the pocket without interrupting the flow of liquid through said strainer member.

2. In a liquid strainer including a body having an inlet and an outlet, a strainer member mounted in said body intermediate said inlet and outlet to separate solid matter from a liquid flowing from said inlet and through said body to said outlet whereby the separated solid matter may collect on said strainer member, means for scraping collected solid matter from the strainer member and movable from side to side over said strainer member, and means providing a pocket at a side of said strainer member whereby solid matter scraped from said strainer member by the scraping means may be carried by the scraping means to be dumped into said pocket upon movement of said scraping means toward and to said pocket to permit removal of the solid matter from the pocket without interrupting the flow of liquid through said strainer member, said scraping means including a part connected to a suction creating means whereby when said part is aligned with said pocket the solid matter dumped into said pocket may be removed through said part by the action of said suction creating means.

3. In a liquid strainer including a body having an inlet and an outlet, a strainer member mounted in said body intermediate said inlet and outlet to separate solid matter from a liquid flowing from said inlet and through said body to said outlet whereby the separated solid matter may collect on the strainer member, cleaning means connected to a suction creating means and adapted to reverse the flow of water through said strainer member upon operation of the suction creating means to remove collected solid matter from said strainer member, said cleaning means being movable from side to side over said strainer member to scrape solid matter adhering thereto from said strainer member, said body having a pocket therein at a side of said strainer member whereby solid matter scraped from said strainer member by the cleaning means upon movement thereof over said strainer member may be carried by the cleaning means to be dumped into said pocket upon movement of said cleaning means toward and to said pocket to permit removal of the solid matter from the pocket through the cleaning means upon operation of the suction creating means and alignment of the cleaning means with said pocket.

4. In a liquid strainer including a body having an inlet and an outlet, a strainer member in said body and including a substantially arc-shaped surface and adapted to separate solid matter from a liquid flowing from said inlet and through said body to said outlet whereby the separated solid matter may collect on said strainer member, scraping means, means supporting said scraping means for movement from side to side over said substantially arc-shaped surface, said body having a pocket therein at a side of said substantially arc-shaped surface, and means for moving said scraping means over said substantially arc-shaped surface to scrape collected solid matter from said surface and to dump the solid matter into said pocket upon movement of said scraping means toward and to said pocket to permit removal of the solid matter from the pocket without interrupting the flow of liquid through said strainer member.

5. In a liquid strainer including a body having an inlet and an outlet, a strainer member in said body and including a substantially arc-shaped surface and adapted to separate solid matter from a liquid flowing from said inlet and through said body to said outlet whereby the separated solid matter may collect on said strainer member, cleaning means connected to a suction creating means and adapted to reverse the flow of water through said strainer member upon operation of the suction creating means to remove collected solid matter from said strainer member, means supporting said scraping means for movement from side to side over said substantially arc-shaped surface, said body having a pocket therein at a side of said substantially arc-shaped surface, and means for moving said cleaning means over said substantially arc-shaped surface to scrape collected solid matter from said surface and to dump the solid matter into said pocket upon movement of the scraping means toward and to said pocket to permit removal of the solid matter from the pocket through the cleaning means upon operation of the suction creating means and alignment of the cleaning means with said pocket.

6. In a liquid strainer including a body havan inlet and an outlet, a strainer member mounted in said body intermediate said inlet and outlet to separate solid matter from a liquid flowing from said inlet and through said body to said outlet whereby the separated solid matter may collect on said strainer member, a nozzle in said body and opening adjacent the strainer member and connected to a suction creating means, means for supporting said nozzle for movement from side to side over said strainer member, said body having a pocket therein at a side of said strainer member, and means for moving said nozzle over said strainer member whereby solid matter collected on said strainer member is removed therefrom upon alignment of the nozzle with the strainer member and operation of said suction creating means to reverse the flow of liquid through said strainer member whereby liquid flows into said nozzle, said nozzle scraping collected solid matter from said strainer member upon movement of the nozzle over the strainer member, said nozzle carrying the solid matter to said pocket to dump said solid matter into said pocket upon movement of the nozzle over the strainer member toward and to said pocket whereby solid matter dumped into said pocket is removed from the pocket through the nozzle upon operation of the suction creating means and when the nozzle is aligned with said pocket.

7. In a liquid strainer having an inlet and an outlet, a strainer member intermediate said inlet and outlet and having pockets at opposite ends thereof, a nozzle having the inlet portion thereof arranged in close proximity to said strainer member, and means for moving said nozzle over said strainer member whereby solid matter separated from the liquid passing through said strainer member is scraped from said strainer member into one of said pockets so that when said nozzle is aligned with said pocket and water is induced to flow into said nozzle the solid matter will pass through said nozzle from said strainer.

8. In a liquid strainer having an inlet and an outlet, a strainer member intermediate said inlet and outlet and having a pocket intermediate the ends thereof, a nozzle having the inlet portion thereof arranged in close proximity to said strainer member, and means for moving said nozzle over said strainer member whereby solid matter separated from the liquid passing through said strainer member is scraped from said strainer member into said pocket so that when said nozzle is aligned with said pocket and water is induced to flow into said nozzle the solid matter will pass into said nozzle from said pocket.

9. In a liquid strainer including a body having an inlet and an outlet and a chamber intermediate said inlet and outlet, ribs on said body and projecting into said chamber, a strainer member mounted in said chamber to separate solid matter from a liquid flowing through said chamber from said inlet to said outlet, means for scraping collected solid matter from the strainer member and movable from side to side over said strainer member, means connecting the side edges of the strainer member to said ribs, said body having a pocket therein adjacent one of said ribs whereby said one rib provides a side of said pocket so that solid matter scraped from said strainer member by the scraping means may be carried by the scraping means past said rib to be dumped into the pocket upon movement of said scraping means toward and to the pocket to permit removal of the solid matter from the pocket without interrupting the flow of liquid through said strainer member.

10. In a liquid strainer including a body having an inlet and an outlet and a chamber intermediate said inlet and outlet, ribs on said body and projecting into said chamber, a substantially arc-shaped strainer member mounted in said member to separate solid matter from a liquid flowing through said chamber from said inlet to said outlet, means for scraping collected solid matter from the strainer member and movable from side to side over said substantially arc-shaped strainer member, said strainer member having flanges at the side edges thereof, means respectively connecting the flanges to the ribs, said body having pockets therein coextensive with said ribs and positioned adjacent thereto whereby each of said ribs provides a side of a pocket, and means for moving said scraping means over said strainer member to scrape solid matter collected on said strainer member therefrom and to carry the solid matter scraped from the strainer member to one of said pockets upon movement of said scraping means toward and to one of the pockets to permit removal of the solid matter from the pocket without interrupting flow of the liquid through the strainer member.

11. In a liquid strainer including a body having an inlet and an outlet and a chamber intermediate said inlet and outlet, ribs on said body and projecting into said chamber, a substantially arc-shaped strainer member mounted in said chamber to separate solid matter from a liquid flowing through said chamber from said inlet to said outlet, a nozzle, means supporting said nozzle in said chamber for movement from side to side over said substantially arc-shaped strainer member, said nozzle having the sides thereof depressed to provide recesses, said body having pockets therein adjacent said ribs whereby each of said ribs provides a side of a pocket, and means for moving said nozzle over said strainer member to scrape solid matter collected on said strainer member therefrom whereby solid matter collects in a recess in the side of the nozzle in the direction in which it is being moved to thereby be carried to and to be dumped into one of said pockets upon movement of said nozzle toward and to said one of the pockets whereby the solid matter may be removed from the pocket through said nozzle upon alignment of the nozzle with the pocket.

12. In a liquid strainer including a body having an inlet and an outlet, a strainer member mounted in said body intermediate said inlet and outlet to separate solid matter from a liquid flowing from said inlet and through said body to said outlet whereby the separated solid matter may collect on said strainer member, a nozzle in said body and opening adjacent the strainer member and connected to a suction creating means, means supporting said nozzle for movement from side to side over said strainer member, said body having a pocket therein at a side of said strainer member, and means for moving said nozzle over said strainer member whereby solid matter collected on said strainer member is removed therefrom upon alignment of the nozzle with the strainer member and operation of said suction creating means to reverse the flow of liquid through said strainer member whereby the liquid flows into said nozzle, said nozzle scraping collected solid matter from said strainer member upon movement thereof over the strainer member, said nozzle carrying the solid matter to said pocket to dump said solid matter into said pocket upon movement of the nozzle over the strainer member toward and to said pocket whereby solid matter dumped into said pocket is removed from the pocket through the nozzle upon operation of the suction creating means and when the nozzle is aligned with the pocket, said nozzle having a part providing a passage leading to the outlet end of said nozzle whereby solid matter jammed in said pocket may be loosened by insertion of a device through said passage, said means for moving said nozzle being connected at the outer end of said passage and closing the passage to prevent leakage.

13. In a liquid strainer including an inlet and an outlet, a strainer member intermediate said inlet and outlet for separating and collecting solid matter from the liquid as it flows from said inlet through said strainer member to said outlet, cleaning means movable over said strainer member and through which solid matter collected on said strainer member is discharged from said strainer, said cleaning means having an opening therein affording access to the interior thereof whereby any foreign matter collected therein may be forced therefrom, means for normally closing said opening, and means for connecting the closing means to the cleaning means whereby said cleaning means may be moved over said strainer member upon manipulation of the closing means.

14. In a liquid strainer including a body having an inlet and an outlet, a strainer member mounted in said body intermediate said inlet and said outlet to separate solid matter from a liquid flowing from said inlet and through said body to said outlet whereby the separated solid matter may collect on said strainer member, a nozzle for scraping collected solid matter from said strainer member and movable from side to side over said strainer member and connected to a suction creating means, said body having a pocket therein at a side of said strainer member whereby solid matter scraped from said strainer member by the nozzle may be carried by the nozzle to be dumped into said pocket upon movement of the nozzle toward and to said pocket to permit removal of the solid matter from the pocket upon operation of the suction creating means and alignment of the nozzle with the pocket, said body having a recess therein, a member on said nozzle providing a boss mounted in said recess, and means connected to said boss and extending from said body and adapted to be operated to move said nozzle over said strainer member.

JOHN R. WINTON.